United States Patent [19]

Wogelius

[11] Patent Number: 4,867,735
[45] Date of Patent: Sep. 19, 1989

[54] METHOD AND APPARATUS FOR CONTINUOUS PRODUCTION OF BAGS FROM THERMOPLASTIC FILM

[75] Inventor: Donald E. Wogelius, South Windsor, Conn.

[73] Assignee: First Brands Corporation, Danbury, Conn.

[21] Appl. No.: 103,998

[22] Filed: Oct. 1, 1987

[51] Int. Cl.$^4$ ................................................ B31B 1/64
[52] U.S. Cl. ...................................... 493/197; 493/194; 493/203; 493/205; 493/208; 156/515
[58] Field of Search ............... 493/194, 197, 202, 203, 493/205, 208, 225, 928; 156/515, 582, 583.5

[56] References Cited

U.S. PATENT DOCUMENTS

| | | | |
|---|---|---|---|
| 3,725,180 | 4/1973 | Membrino | 156/515 |
| 4,016,806 | 4/1977 | Schuster | 493/208 |
| 4,023,470 | 5/1977 | Van der Meulen | 493/208 |
| 4,331,502 | 5/1982 | Achelpohl et al. | 156/583.5 |
| 4,664,649 | 5/1987 | Johnson et al. | 493/208 |

Primary Examiner—Robert P. Olszewski
Assistant Examiner—Robert Showalter
Attorney, Agent, or Firm—Gary L. Wamer

[57] ABSTRACT

A method and apparatus are provided for continuous fabrication of bags from a longitudinally advanced multi-layer thermoplastic film web fed tangentially onto a rotating drum for carrying out transverse web seam welding and severing, the principal novel feature being provision of preliminary heating carried out across at least part of the width of web at which the final seam and sever is to take place. The preliminary heating step is advantageous where the thickness of film layers to be sealed and severed is not uniform across the width of the web or in which the uniform thickness of the film layers is such that seaming and severing in a single step requires an undesirably long time for continuous high speed production. The method can be adapted for production of bags of different widths.

37 Claims, 4 Drawing Sheets

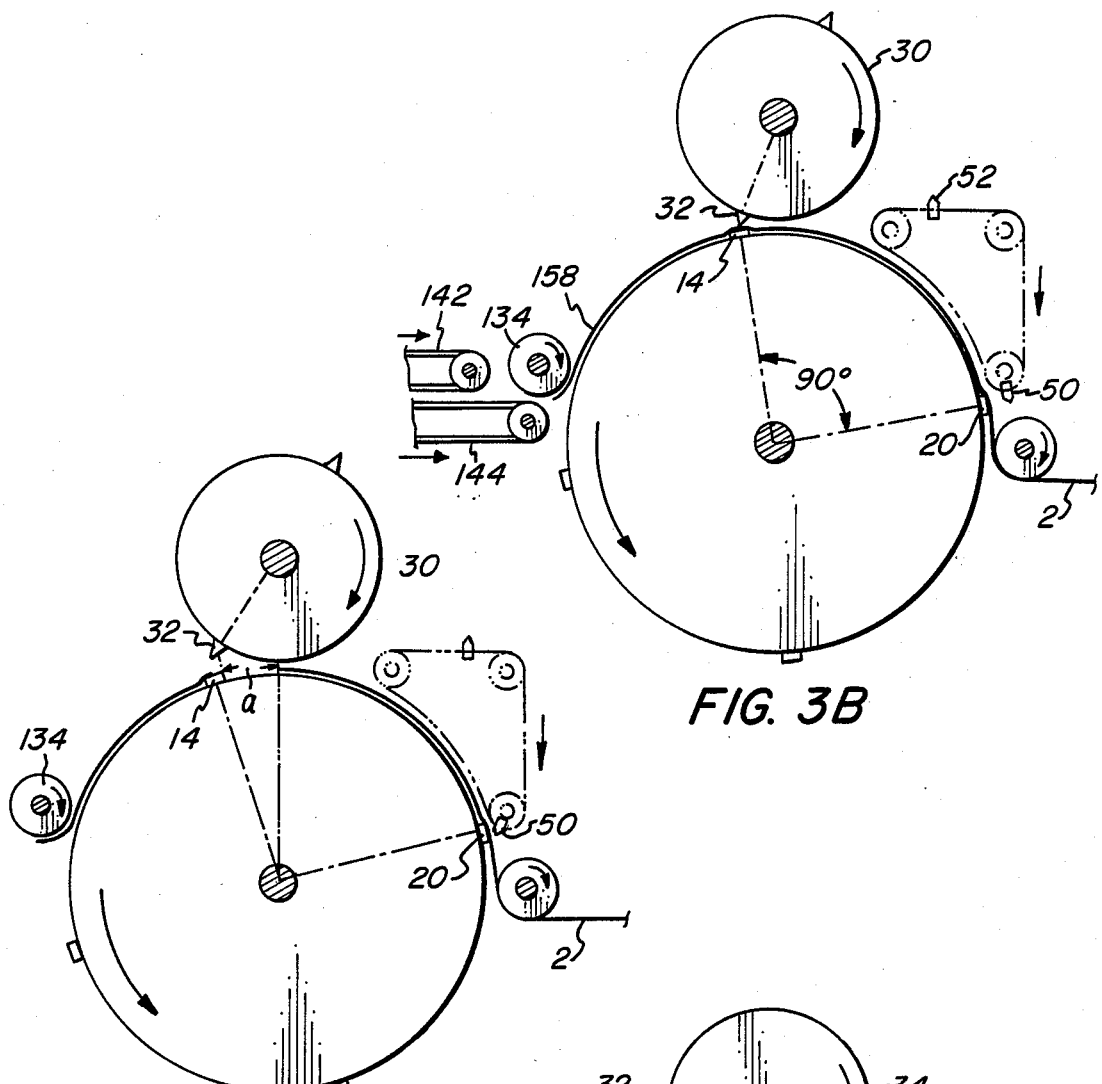
FIG. 3B
FIG. 3C
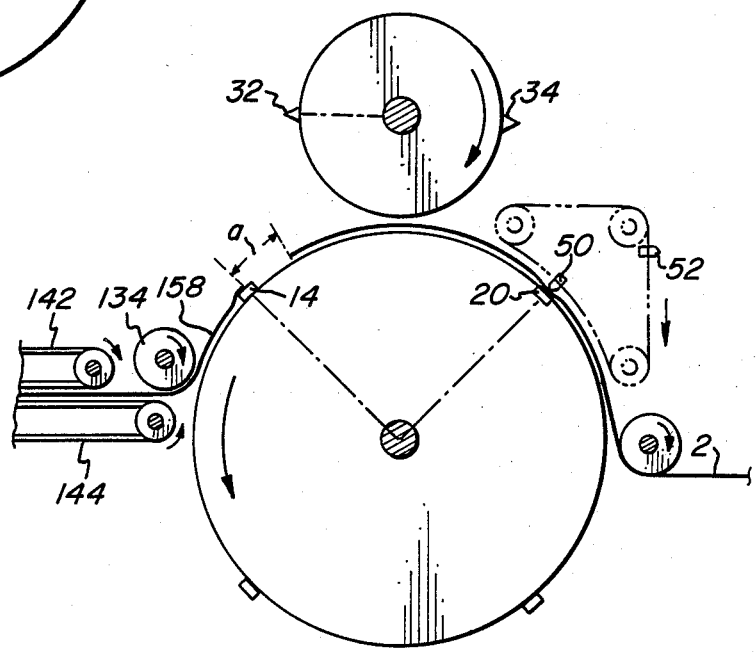
FIG. 3D

METHOD AND APPARATUS FOR CONTINUOUS PRODUCTION OF BAGS FROM THERMOPLASTIC FILM

BACKGROUND OF THE INVENTION

1. Field of the Invention

This invention relates to a method and apparatus for the continuous production of bags from thermoplastic film and is more particularly concerned with improvements in the method and apparatus for the continuous production of bags from a multi-layer continuous web of thermoplastic film in which the web is passed on to a rotating drum where successive portions are seam welded and severed in lengths corresponding to the width of the desired bags.

2. Description of the Prior Art

Various methods and apparatus are known in the art for the continuous production of bags such as garbage bags and the like from thermoplastic film. One such method, and apparatus for carrying out the method is that described in van der Meulen U.S. Pat. No. 4,023,470. The method comprises feeding a web of a two layer thermoplastic film, in which the layers are continuously joined along one longitudinal edge, tangentially on to a rotating welding drum under tension. The tension is achieved by employing web loop formers which engage the web at a location prior to its arrival o the drum. The tension serves to ensure that the web is drawn on to the drum surface in taut and smooth form thus enabling the web to be fed at high speeds. At the time of each seam welding and severing step the web tension is released momentarily by disengaging the web loop formers. Carrying out the welding on the unstressed web is said to ensure a better seam weld and avoid damage to the bag or weld which might occur if the web were under stress during the welding operation.

It has been found that the method described in the above patent can be employed satisfactorily and successfully in production of bags at relatively high speeds so long as the web of film layers employed has a relatively uniform thickness across the width of the web and so long as the thickness of each of the film layers does not exceed about 3 mils. When these conditions are not met it is found that problems arise. Thus where, for example, the free edges of the film layers are folded over to form a hem so that there are four thicknesses of film along these edges and only two thicknesses of film across the rest of the width of the web, it is found that satisfactory seam welding and severance cannot be achieved in the four film thick region in the time required to weld and sever the two film thick region. This problem is even more acute in the case of trash bags which are provided with a draw-string. In this instance the thickness of two draw-strings is added to the four thicknesses of film in the hems which accommodate the draw-strings to make a total thickness of 14 mils or even higher which has to be sealed and severed. If the time for seam welding and severance is increased to permit satisfactory completion of this step in the thicker region the seam formed in the thinner region may be affected deleteriously. Further the rate of production is reduced as a result of the increased time taken to accomplish the step. The latter is also the case where the thickness of each of the film layers, although uniform across the width thereof, exceeds of the order of 3 mils. Such films, which are required for heavy duty bags, require a significantly longer period in which to accomplish satisfactory seam welding and severance.

Attempts have been made to overcome these problems by carrying out a "preliminary seal" at the location on the web at which the ultimate seam welding and severance step is to take place. The terms "preliminary seal" and "preliminary sealing" as used herein and throughout this specification and claims mean a preliminary heating step applied at designated locations on the thermoplastic material of the web which step serves at least to soften the material at the location so treated. The term is not intended to imply that actual sealing of some or all of the various layers of the web takes place.

These disadvantages in the prior art methods are overcome by the method and apparatus of the present invention which will be described in detail below. Further, it has been found that the method of the present invention enables one to reduce significantly the width of the seam formed on the edges of the bag produced thereby. This is an important consideration in the case of bags such as trash bags provided with a drawstring closure. Thus the amount by which the bag can be opened is reduced by the width of the seams on either side of the bag. An reduction in the size of the opening makes is difficult to fit the bag mouth over a garbage can rim when the bag is used as liner. This reduction in width of seams is achieved by the present invention because of accurate registration with the preliminary seal in the final seam welding and severance step. Thus, it has been found that, using the process and apparatus of the present invention, preliminary seals having a width as low as about 0.125 inches in the direction of movement of the web can be achieved routinely and that the width of the side seam weld on the bags so produced is of the order of about 0.0625 inches. These findings represent a marked improvement over the results achieved using previous methods available in the art.

The various advantages discussed above and additional advantages which will become apparent from the description which follows will be readily understood by those skilled in the art.

SUMMARY OF THE INVENTION

It is an object of the invention to provide an improved process for the continuous fabrication of bags from a longitudinally advanced multi-layer thermoplastic film web.

It is a further object of the invention to provide a process for the continuous fabrication of bags from a longitudinally advanced multiple layer thermoplastic film web which does not have uniform thickness across the width of the web.

It is yet another object of the invention to provide a process for the continuous fabrication of bags from a longitudinally advanced multi-layer thermoplastic film web in which each of the layers has a thickness exceeding about 3 mils.

It is also an object of the invention to provide a process for the continuous fabrication of bags provided with drawstring closures from a longitudinally advanced multi-layer thermoplastic film web at a markedly higher rate of production than hitherto achieved.

These objects, and other objects which will become apparent from the description which follows, are achieved by the process and apparatus of the invention. The process of the invention comprises, in its broadest aspect, a method for the continuous production of bags from thermoplastic film in the form of a continuous longitudinally advanced multi-layer web with the film layers continuously joined along one longitudinal edge of the web, from the leading end of which web bags are successively made by transverse seam welding and severance carried out at equally spaced locations on the web. The method comprises the step of:

feeding the web tangentially on to the outer surface of a continuously rotating welding drum provided with a plurality of welding anvils extending parallel to the rotational axis of the said drum and spaced substantially equally about its circumference;

effecting a preliminary seal of the film layers along at least part of a path transverse to the direction of travel of the web during a predetermined length of travel of the said web on the said drum; and thereafter simultaneously welding and severing said web along the whole of said transverse path inclusive of said preliminary seal.

The preliminary sealing and the seam welding and severing steps are accomplished while said drum has been rotated through an angle of 360°/A where A is the number of welding anvils on the drum.

In a particular embodiment of the invention the distance (X) between the neighboring anvils on the drum is greater than the width (Y) of the bags to be formed and the method of the invention comprises an additional step, carried out immediately after completion of the welding and severing step, of pulling back the newly formed leading edge of the said web a distance on said drum circumference equal to an amount represented substantially by X minus Y in the direction opposite to that of rotation of the drum.

The invention also comprises apparatus for carrying out the method of the invention. In its broadest aspect the apparatus of the invention comprises a frame and a welding drum mounted therein, the said drum having a plurality of elongated welding anvil elements extending parallel to the axis of rotation of the drum and spaced equally about the circumference thereof, each anvil element being resiliently mounted on said drum and movable radially towards and away from the drum axis and biased outwardly to a normal position slightly above the drum surface. Means are provided for continuously rotating the drum, for feeding and positioning a continuous web of multi-layer thermoplastic film tangentially on to the circumferential surface of the drum, and for retaining the web on the drum surface after it is received thereon. Preliminary sealing means are provided comprising means for bringing at least one heating bar into contact with a portion of the web located over one of the anvil elements, for moving the heating bar synchronously with said web and underlying anvil while maintaining said contact during rotation of the drum and retained web through a predetermined distance, and for removing the heating bar from contact with said web. Means are also provided for bringing a welding bar into seam welding and severance contact with the full width of said web and underlying anvil in registration with the location of prior contact with said heating bar and for removing said welding bar from contact with said web after completion of said seam welding and severance. Web pull-back means is provided to pull the web back relative to rotation of the welding drum by a predetermined distance in the direction opposite to that of rotation of the drum. The rotation of the drum and the movements of said heating bar, the welding bar and the web pull-back means are all driven in appropriate mutually timed relationship.

BRIEF DESCRIPTION OF THE DRAWINGS

FIGS. 3A-D illustrate in schematic form the sequence of steps in producing a bag in accordance with the method of the invention.

DETAILED DESCRIPTION OF THE INVENTION

The method and apparatus of the invention will now be illustrated by reference to the accompanying drawings which show an embodiment in which a portion of one edge of a web of thermoplastic film, in which the edge in question is of thickness greater than the rest of the web, is subjected to a preliminary sealing prior to the final seam welding and severance to form a bag from the web. It is to be understood however that the invention is not limited to this particular embodiment.

Figure 1:
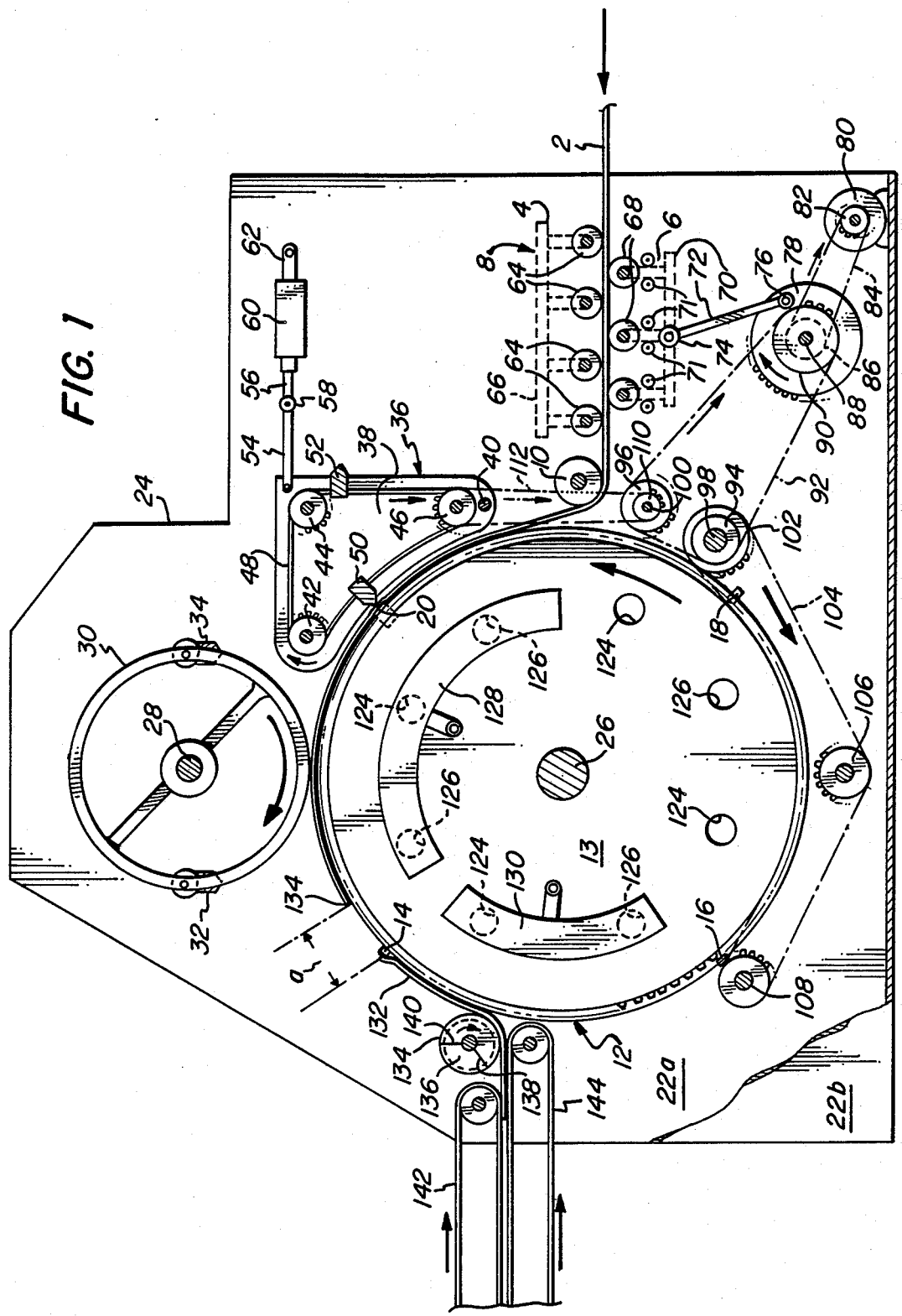
FIG. 1 is a side elevation view, partially broken away and partially schematic in representation, of apparatus for carrying out the method of and incorporating machine aspects of the invention.

In the embodiment shown generally in FIG. 1 a continuous two-layered synthetic thermoplastic film web 2, having the film layers continuously joined along one longitudinal edge of the web and having a folded hem with drawstring enclosed therein on each of the edges shown in the side view presented in the FIGURE, is fed between the opposing halves 4 and 6 of a web loop former shown generally as 4 and via guide roll 10 on to the circumferential surface of a continuously rotating welding drum 12. The latter is rotatably supported in the parallel opposite vertical frame sides 22a and 22b of frame 24 and is provided with four elongated anvils or seal pads 14, 16, 18 and 20 substantially equally spaced about the circumference of the drum. Each anvil traverses the width of the drum surface with its longitudinal axis parallel to the axis 26 of drum 12. Also rotationally mounted in frame 24 with its axis 28 vertically above and aligned parallel to axis 26 of the drum 12 is an open cylindrically shaped frame 30 which supports two diametrically opposed welding bars 32 and 34. The latter are pivotally mounted at their ends and extend across the width of frame 30 with their longitudinal axes parallel to axis 28. Frame 30 rotates in the opposite direction (shown by arrow) to drum 12 and the speed of rotation of the two is synchronized by means of a gear chain mechanism (not shown). The circumferential distance between welding bars 32 and 34 is equal to the circumferential distance between each of anvils 14, 16, 18 and 20 and the position of welding bars 32 and 34 relative to the latter anvils is such that, during each 90° rotation of drum 12 one of the welding bars registers with an anvil and makes seam welding and severance contact with the web 2 across the whole wdith thereof.

A preliminary sealing device shown generally in schematic form as 36 comprises a frame 38 pivotally supported at 40 on frame 24. Frame 38 is provided with rollers 42, 44. and 46 which together support a continuous belt 48. Two welding bars 50 and 52 are carried by said belt 48 and are spaced apart from each other by a distance precisely equal to the circumferential distance between the centers of any of the neighboring pairs of anvils 14, 16, 18 and 20. The belt 48 traverses a path between rollers 46 and 42 which is spaced a predetermined distance from the surface of the drum 12 and matches the contour thereof. Belt 48 is conformed to this path by cooperation with guides mounted on the periphery of drum 12 as shown in detail in FIG. 5 discussed below. The rate of travel of belt 48 is synchronized with that of the circumferential surface of drum 12 (by drive mechanisms described below). The positions of heating bars 50 and 52 are so adjusted that each in turn registers precisely with one of the anvils 14, 16, 18 and 20 as each said bar begins the path between rollers 46 and 42. Heating bars 50 and 52 are aligned with their longitudinal axes parallel to those of anvils 14, 16, 18 and 20 and are so oriented and of such a length that, when each bar is in registry with an anvil, the bar is in sealing contact with whatever portion of the width of the web is to receive the preliminary seal. In the embodiment shown in FIGS. 1-5, the heating bars 50 and 52 are single bars so located as to register with one edge of web 2. Where the web is to receive a preliminary seal in more than one location across the width thereof an appropriate number of heating bars of the desired dimensions is provided in place of, or in addition to, the bars 50 and 52. Where the preliminary seal is to extend substantially completely across the width of web 2 the bars 50 and 52 will themselves extend the appropriate distance across the width of the web.

The frame 38 can be pivoted away from the circumferential surface of drum 12 by operation of pneumatically driven piston assembly 60 mounted by fastener 62 on frame 24 and connected via rods 54 and 56 and connecting pin joint 58 to the upper corner of frame 38. This feature of the apparatus, namely the means to pivot preliminary sealer 36 away from the periphery of drum 12, is a safety feature to be operated if and when the production of bags is interrupted for any significant amount of time. When such an interruption occurs it is desirable and necessary to remove the hot welding bars 50 and 52 from proximity to the web 2 in order to avoid heat damage to the latter caused by prolonged local exposure of the web to the heat of said bar.

The web pull-back means of the embodiment shown in FIG. 1 comprises the web loop former 8. The latter comprises a first set (4) of rollers 64 rotatably mounted on frame 66 and aligned in parallel with their longitudinal axes parallel to the plane of web 2 and perpendicular to the direction of travel of said web. Frame 66 is rigidly mounted, by means not shown, on frame 24 thus holding rollers 64 in fixed position relative to web 2. A second set 6 of rollers 68 is rotatably mounted on frame 70 which is adapted for reciprocating movement between pairs of guide rolls 71 in a direction vertical to the direction of movement of web 2. The upward movement of rollers 68 in contact with the underside of web 2 pushes loops of the latter upward between rollers 64 and applies tension to the web. As discussed more fully below, the amount by which web 2 can be pulled back relative to rotation of drum 12 is a function of the number of rollers in each of sets 4 and 6 and the distance through which the lower set 6 is capable of moving in contact with the web 2. Reciprocating movement of rollers 68 on frame 70 is actuated by rod 72 pivotally mounted at one end 74 to frame 70 and pivotally mounted at the other end 76 to rotatable cam 78. Cam 78 is rotated in carefully timed relationship to rotation of drum 12 and belt 48 by a series of drive elements such as belts or chains and cooperating sprockets the whole system being driven by electric motor 80. The latter, through its drive sprocket 82, drive element 84 and shaft sprocket 86, drives intermediate drive shaft 88 appropriately rotatably supported on brackets affixed to frame 24. From sprocket 90 also located on drive shaft 88 and a second drive element 92, motion is transmitted simultaneously to sprockets 94 and 96 mounted on drive shafts 98 and 100, respectively, each of which latter is also rotatably mounted on support brackets affixed to frame 24. Sprocket 102 also mounted on drive shaft 98 imparts motion to a third drive element 104 which is mounted over tension pulley 106 and idler pulley 108 to provide between sprocket 102 and pulley 108 an upper reach which drivingly engages drum 12 and causes rotation thereof. Simultaneously sprocket 110 mounted on drive shaft 100 acting through a fourth drive element 112 and a sprocket (not shown) mounted on the end of roller 46 imparts motion to drive belt 48 to move the latter at a rate synchronized with the rate of travel of the periphery of drum 12.

As will be discussed in detail below, the rotation of cam wheel 78 is so timed with respect to said drum 12 that the upward movement of rollers 68 to apply web loop former tension to web 2 occurs immediately after the seam welding and severance contact between welding bars 32 or 34 and a corresponding anvil has been completed. The cam wheel 78 is caused to make one complete revolution for each rotation of 90° imparted to drum 12. As will be obvious to one skilled in the art the rotation of drum 12 through 90° represent the completion of one complete cycle, i.e. the formation of one bag, because in the particular embodiment shown in FIG. 1 there are four (4) anvils substantially equally spaced about the drum at which the seaming and severance step at the end of a bag forming cycle occurs. If there are less than or more than four anvils located on the drum the angle through which the drum rotates during completion of a single cycle in the formation of a bag is 360° divided by the number of anvils present and the relationship between rotation of the cam wheel 78 and that of drum 12 is adjusted accordingly so that the cam wheel makes one complete rotation for each cycle in the formation of a bag. Similarly, when there are less than or more than four anvils located on drum 12 the rate of rotation of frame 30 and or its dimensions and or the number of weld bars located thereon is/are adjusted so that a weld bar is brought into registration with each anvil as the drum 12 and frame 30 are rotated in the manner described above.

Figure 2:
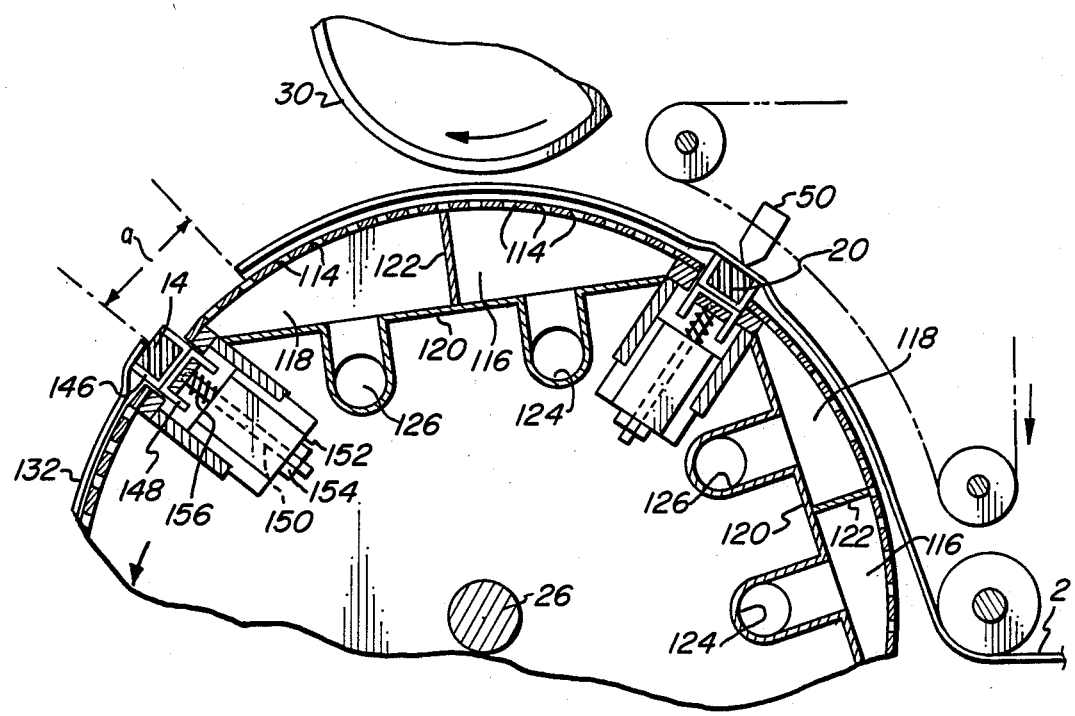
FIG. 2 is a fragmentary section of the welding drum shown in FIG. 1 and taken in a plane perpendicular to the drum axis and through an edge of the web on which a preliminary seal is being formed.

After the web 2 has been received on the circumferential surface cf drum 12 it is held firmly in place thereon, at least until after final seam welding and severance is complete, by means of vacuum applied to the underside of the web via multiple perforations 114 as shown in the partial cross-sectional view shown in FIG. 2. Elements common to FIGS. 1 and 2 are shown by the sam numerals in both instances. As also shown in FIG. 2 the space between adjacent anvil elements and immediately beneath the perforated surface of the drum 12 is divided into semi-segmented chambers 116 and 118 by a longitudinal plate 120 in chord-like disposition over the width of the drum and a central longitudinal partition plate 122 extending between plate 120 and the inner surface of the drum. Each of chambers 116 and 118 communicates through one or more apertures with a respective conduit 124 or 126. Each of the latter runs to, and opens through, mouths at drum wall end 13 for application of vacuum or pressurized air as the mouths pass respectively a vacuum manifold 128 or a pressurized air manifold 130. Hence, as web 2 is fed on to the drum surface the mouths of the conduits 124 and 126 leading to the chambers 116 and 118 beneath the perforated surface of the drum, beginning at the point of first contact of the web and continuing until well past the point at which seam welding and severance takes place, are in communication with vacuum manifold 128 whereby the portion of the web in question is held firmly in place.

At the particular point in the production cycle represented in FIG. 1, a first bag 132 has been formed and the cycle is well advanced in the formation of a new bag. Seam welding and severance of bag 132 has taken place by combined action of welding bar 32 and anvil 14. Further, as explained in more detail below, the web loop former mechanism 8 has already been activated to apply necessary tension to web 2 to pull back the new leading edge 134 of the web a circumferential distance "a" this distance being the difference between the circumferential distance (X) separating the centerpoint of anvils 14 and 20 and the width (Y) of the bag to be formed. The conduits 124 and 126 in contact with the chambers 116 and 118, both of which at some point are underlying the newly formed bag 132. are in contact with the pressurized air manifold thus facilitating release of the bag 132 from the surface of drum 12. The bag 132 is removed from the surface by removal means which comprises a hollow rotating roller 134 aligned with its longitudinal axis parallel to the axis 26 of drum 12. The surface of the roller over chamber 136 bounded by radial plates 138 and 140 is perforated and a slight vacuum is applied to chamber 136 by an appropriate conduit (not shown) communicating with the sam or a different vacuum source as manifold 128. The rotation of roller 134 is so timed that the section of its surface communicating with chamber 136 contacts the leading edge of bag 132. The combined action of low vacuum via chamber 136 and pressurized air through the surface of drum 12 facilitates removal of the leading edge of bag 132 from the drum surface followed by insertion of said leading edge between continuous moving belts 142 and 144 which remove the bag to a storage and or packaging zone (not shown).

As shown in FIG. 2 each of the anvil elements (of which only 14 and 20 are shown in the figure) comprise the anvil element itself, shown as 14 or 20, received in the top channel of a composite H-shaped support bar comprised of a pair of flat bottomed channel elements 146 and 148 disposed in back to back relationship. Stud bolt 150 has one end secured in channel member 148 and the other one extending through a guide aperture in box section 152 and provided with terminal nut 154. Helical compression spring 156 around bolt 150 is interposed between the bottom of channel 148 and the upper surface of box section 152 to bias anvil element 14 outwardly and cause it to project outwardly and slightly above the surface of drum 12. As shown for anvil element 20 in FIG. 2, when heating bar 50 is in contact with the anvil element the downward pressure exerted by the bar is insufficient to bias the anvil element slightly downwardly against the action of spring 156. However, when weld bar 32 later comes into seam welding and severing contact with anvil 20 the pressure exerted by the bar 32 is sufficient to bias the anvil 20 downwardly against the action of spring 156. This ensures that excellent seam welding contact of the bar with the web occurs.

Figure 3A:
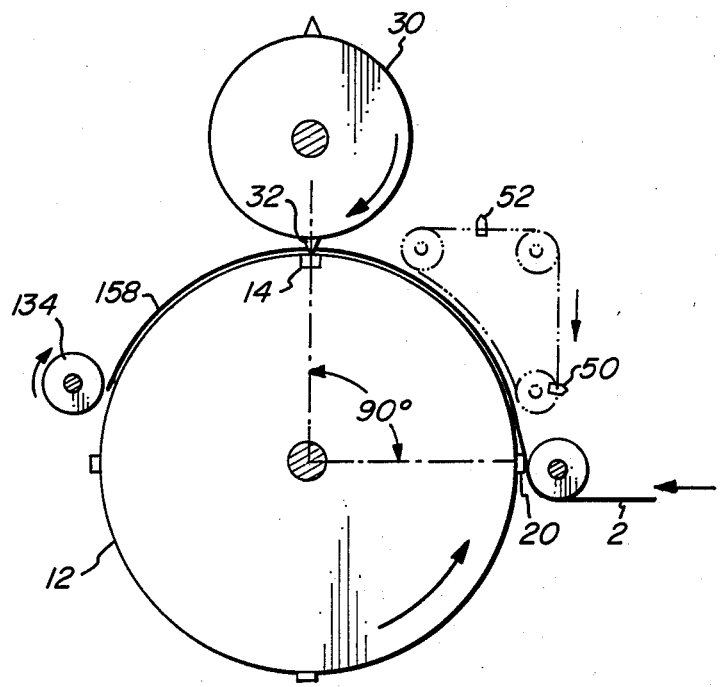

FIGS. 3A–D illustrate in schematic form the various key steps in forming of a bag in accordance with the method of the invention. FIG. 3A shows the situation in which weld bar 32 and anvil 14 are in exact registration with each other and seam welding and severance are taking place across the width of web 2 to form bag 158. FIG. 3B shows the situation immediately following the seam welding and severance shown in the previous figure. Drum 12 has rotated through approximately 10° and contact between weld bar 32 and anvil 14 has just ceased. The leading edge of bag 158 is being taken up on roll 134 preparatory to being guided between continuously moving belts 142 and 144. At this juncture the web loop former 8 (not shown in FIGS. 3A–D) is activated to apply tension to web 2 and cause the new leading edge of the latter to be pulled back (i.e. in the opposite direction to that in which the drum surface is moving) relative to rotation of the drum surface a circumferential distance "a" as illustrated in FIG. 3B. The distance "a" through which the web 2 is pulled back in any given instance is the difference between (1) the distance between neighboring anvils e.g. between anvils 14 and 20 and (2) the length of the bag to be formed. It will be seen from FIG. 3C that, at the completion of the pull-back, the weld bar 50 on the preliminary sealer is about to make contact with anvil 20. In FIG. 3D the drum 12 has rotated approximately 45° beyond the situation shown in FIG. 3A and the weld bar 50 and anvil 20 have moved synchronously in seam welding contact with the web for approximately two thirds of the distance in which they travel in such contact. At this stage the leading edge of the previously formed bag 158 has been received between the moving belts 142 and 144 and shortly thereafter will have been completely removed from the drum.

When drum 12 has turned a full 90° from the position shown in FIG. 3A the seam welding contact between heating bar 50 and anvil 20 in the preliminary sealing step has ended and weld bar 34 has registered accurately with the anvil 20. Seam welding and severance contact is taking place across the web at the precis location in which the preliminary seal has been made. A new bag is thereby being formed and the cycle shown in FIGS. 3A–D is beginning anew. It is to be noted that, during the whole of the time in which the preliminary seal is being formed and thereafter until the seam welding and severance step is complete, the portion of the web undergoing these steps is being held firmly in place on the surface of the drum by application of vacuum in the manner discussed above. This ensures that no movement of the web relative to the drum takes place and hence precise registration can be achieved between the preliminary seal and the final seal and severance. This permits the actual width of the preliminary seal to be kept to a minimum generally as low as about ⅛".

Further, it will be apparent from the illustration of the method of the invention given in FIGS. 3A–D that the method and apparatus can be employed to produce bags of various widths without significant modification of the apparatus. Thus the only change which has to be made, in changing from production of bags of one width to those of another, is in the amount of pull-back "a". As previously noted this latter is controlled by appropriate adjustment of the web loop former 8. As will be readily apparent to on skilled in the art the amount by which the web is pulled back can be changed by increasing or decreasing the number of rollers in both the stationary set 4 and reciprocating set 6 and or by increasing or decreasing the distance through which the reciprocating set 6 of rollers moves after contacting the web.

Advantageously the temperature at which the heating bars 50 and 52 are maintained is in the range of about 600° F. to 1200° F. the particular temperature employed in any given instance being determined by the nature of the thermoplastic film or films employed and the total thickness of the film layers at the location of the preliminary seal. The temperature employed in weld bars 32 and 34 is within the range of about 600° to 1000° F. the particular temperature employed in any given instance being subject to the same factors discussed above.

Figure 4:
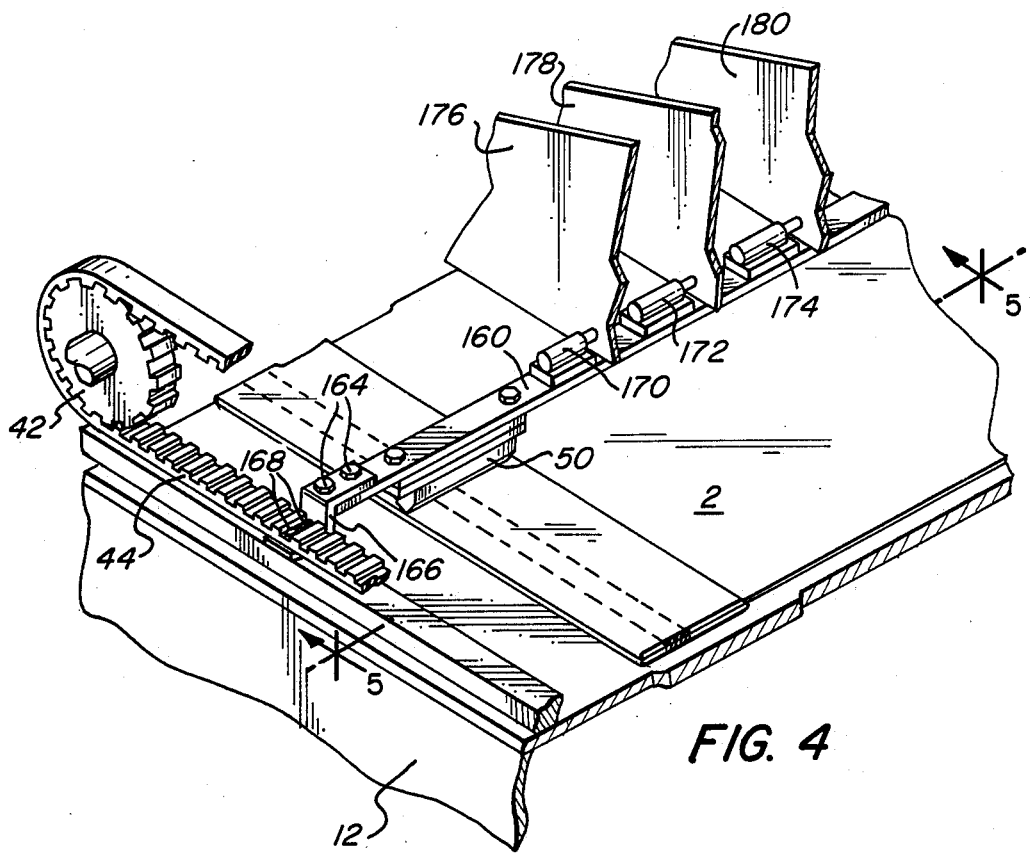
FIG. 4 is a perspective view, partially cut away, of one embodiment of a preliminary sealing device in accordance with the invention.
Figure 5:
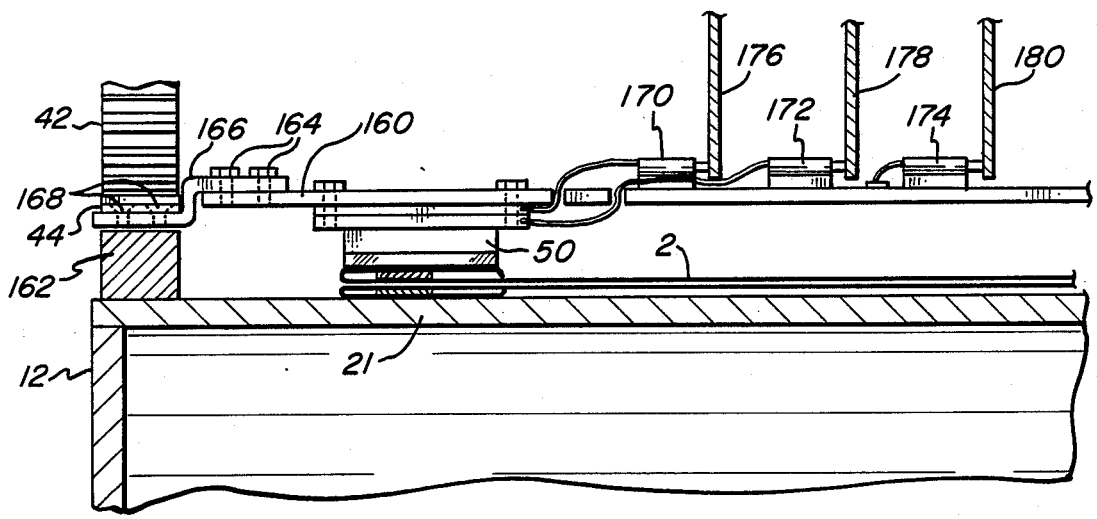
FIG. 5 is a cross-sectional view taken along the line 5—5 in FIG. 4.

FIG. 4 is a partial perspective view of the preliminary sealer 36 showing the heating bar 50 in contact with web 2 and underlying anvil 20 in the same phase of the preliminary sealing mode as that shown in cross-section in FIG. 1. The same numerals are used to designate elements which are common to both figures. Heating bar 50 is mounted on support bar 160 which is attached by bolts 164 to bracket 166 which latter is affixed to flexible belt or chain 48 by threaded screws 168. The underside of the outer end of bracket 166 is supported in sliding engagement with the upper surface of guide rail 162 mounted on the outer edge of drum 12. Bar 160 is transversely disposed above the surface 21 of drum 12 and carries a series of contacts 170, 172, and 174 which make electrical conducting contact with symmetrically aligned plates 176, 178 and 180. Each of the latter is shaped to have a profit which approximates the total path travelled by endless flexible belt 48 as shown in FIG. 1. Plate 176 is connected to a source of 120 voltage AC current, plate 180 is connected to ground and plate 178 is neutral. Contacts 170, 172 and 174 are connected by wires to appropriate terminals on the heating bar 50 and serve to maintain electrical contact between the latter and plates 176, 178 and 180 as the heating bar 50 moves synchronously with anvil 20. FIG. 5 is a cross-sectional view taken along the line 5—5 in FIG. 4 and shows in more detail the manner in which heating bar 50 and contacts 170. 172 and 174 are mounted on bar 160 and attached thereby to bracket 166 on belt 48.

The films which may be employed as the web in the practice of the invention include any three-dimensional material which possesses two opposite facing surfaces separated by edging surfaces. The opposite facing surfaces may be mono- or poly-planar and the combined surfaces typically (and preferably) possess many times the area of the edge surfaces. The film employed in the practice of the invention may be made of any material capable of being sealed by a thermal sealing process, and may be made of plastic, resin, metal, textile, fiber reinforced plastic or resin, composites thereof, and the like. The preferred sheeting used in the practice of the invention are thermoplastic films such as one or more layers of one or more of polyethylene (low density, high density, linear low density and/or combinations), polypropylene, polyethylene copolymers (low density, linear low density and/or combinations), polybutylenes, ABS polymers, polyurethanes, polycarbonates, polysulphones, aliphatic polyamides, polyarylamides, polyaryletherketones, polyarylimideamides, polyaryle-therimides, polyesters, polyarylates, polyoxymethylene, poly(epsilon-caprolactone), and the like, alone or composited with a variety of materials such as metal films, paper cardboard, textile structures, and the like.

The various embodiments of the method and apparatus of the invention which have been set forth above have been given for purposes of illustration only and are not to be construed as limiting. Various modifications and improvements which can be made in respect of these various embodiments without departing from the scope of the invention will be readily apparent to one skilled in the art.

What is claimed:

1. A method for production of bags from thermoplastic film in the form of a continuous longitudinally advanced web having at least two layers with the film layers continuously joined along one longitudinal edge of the web wherein said web has a cross-section such that the number of film layers in one portion is greater than in the thickness of the remainder of said cross-section, from the leading end of which web bags are successively made by transverse seam welding and severance carried out at substantially equally spaced locations on the web, the steps comprising:
   feeding said web tangentially onto the outer surface of a continuously rotating welding drum provided with a plurality of welding anvils extending parallel to the rotational axis of said drum and spaced equally about its circumference;
   effecting a preliminary seal of the film layers during a predetermined length of said travel of said web on said drum along a portion of a path transverse to the direction of travel of the web, wherein said web has a cross-section such that the number of film layers in said portion of said transverse path is greater than in the thickness of the remainder of said cross-section; and
   thereafter simultaneously welding and severing said web along the whole of said transverse path inclusive of said preliminary seal.

2. A method in accordance with claim 1 wherein said preliminary sealing and said welding and severing steps are accomplished and the formation of each bag is completed during the time taken for said drum to rotate through an angle equal to 360° divided by the total number of welding anvils on said drum.

3. A method in accordance with claim 1 wherein said preliminary seal is formed by bringing a heating bar into contact with said portion of the web located over one of said anvils and maintaining said contact during said predetermined travel of said web.

4. A method in accordance with claim 3 wherein said welding and severing of said web is by a welding bar brought into welding and severing contact with said web and an underlying anvil across the whole width of said web in accurate registration with said preliminary seal.

5. A method in accordance with claim 1 wherein the distance (X) on the drum surface between neighboring anvils is greater than the width (Y) of the bags to be produced, which method comprises the additional step, after completion of the welding and severing step, of pulling back said web relative to rotation of said drum by a distance on said drum circumference substantially equal to an amount represented by X minus Y in the direction opposite to that of rotation of the drum.

6. A method in accordance with claim 5 wherein said pull-back is achieved by means of a plurality of cooperating web loop former rolls adapted to engage said film web in a location adjacent that where said web is being fed to said drum.

7. A method in accordance with claim 6 wherein actuation of said cooperating web loop former rolls is achieved by cam means synchronized with the rotation of said welding drum.

8. A method in accordance with claim 1 wherein said cross-section having the greater number of film layers comprises two hems.

9. A method in accordance with claim 8 wherein a drawstring tape is enclosed by each of said hems.

10. A method in accordance with claim 9 wherein said drawstring tape is formed of a thermoplastic material other than that of said film layers.

11. A method in accordance with claim 1 wherein said web is held firmly in contact with the surface of said drum during the whole of the preliminary sealing and the final welding and severance of said web.

12. A method in accordance to claim 1 wherein the width of said preliminary seal in the direction of movement of the web is less than about 0.125 inches.

13. A method in accordance with claim 1 wherein said simultaneous welding and severing of said web forms a side seam on finished, separated bag and the width of the side seam weld on the finished, separated bag is less than about 0.0625 inches.

14. A method for continuous production of bags from thermoplastic film in the form of a continuous longitudinally advanced two layer web with the film layers continuously joined along one longitudinal edge of the web wherein said web has a cross-section such that the number of film layers in one portion is greater than in the thickness of the remainder of said cross-section, from the leading end of which web bags are successively made by transverse seam welding and severance carried out at substantially equally spaced locations on the web, the steps which comprise:

feeding said web tangentially onto the outer surface of a continuously rotating welding drum provided with a plurality of welding anvils extending parallel to the drum axis of rotation and spaced substantially equally about its circumference by a distance (X) greater than the width (Y) of the bags to be formed;

effecting a preliminary seal of said film layers along a portion of a path transverse to the direction of travel of the web, wherein said web has a cross-section such that the number of film layers in said portion of said transverse path is greater than in the thickness of the remainder of said cross-section by bringing a heating bar into contact with said portion of the web located over one of said anvils and maintaining said contact during a predetermined length of travel of said web in contact with said drum circumference;

thereafter simultaneously welding and severing said web along the whole of said path traversing said web inclusive of said preliminary seal; and after completion of the welding and severing step, pulling back the newly formed leading edge of said web relative to rotation of said drum by a distance on said drum circumference substantially equal to X minus Y in the direction opposite to that of rotation of the drum.

15. A method in accordance with claim 14 wherein said pull-back is achieved by means of a plurality of cooperating web loop former rolls adapted to engage said film web in a location adjacent that where said web is being fed to said drum.

16. A method in accordance with claim 15 wherein actuation of said cooperating web loop former rolls is achieved by cam means synchronized with the rotation of said welding drum.

17. A method in accordance with claim 14 wherein said welding and severing of said web is by a welding bar brought into welding and severing contact with said web and an underlying anvil across the whole width of said web in accurate registration with said preliminary seal.

18. A method in accordance with claim 14 wherein said cross-section having the greater number of film layers comprises two hems.

19. A method in accordance with claim 18 wherein a drawstring tape is enclosed by each of said hems.

20. A method in accordance with claim 19 wherein said drawstring tape is formed of a thermoplastic material other than that of said film layers.

21. A method in accordance with claim 14 wherein said web is held firmly in contact with the surface of said drum during the whole of the preliminary sealing and the final welding and severance of the web.

22. A method in accordance to claim 14 wherein the width of said preliminary seal in the direction of movement of the web is less than about 0.125 inches.

23. A method in accordance to claim 14 wherein said simultaneous welding and severing of said web forms a side seam on finished, separated bag and the width of the side seam weld on the finished, separated bag is less than about 0.0625 inches.

24. Apparatus for fabrication of bags by transverse seam welding and severance from the leading edge of a longitudinally advanced web having at least two layers of thermoplastic film and having the film layers continuously joined along one longitudinal edge of the web wherein said web has a cross-section such that the number of film layers in one portion is greater than in the thickness of the remainder of said cross-section, said apparatus comprising:

a frame and a welding drum mounted therein;

said drum having a plurality of elongated welding anvil elements extending parallel to the axis of rotation of said drum and spaced substantially equally about its circumference thereof each anvil element being resiliently mounted in said drum and movable radially toward and away from said drum axis and biased outwardly to a normal position slightly above the drum surface;

means for continuously rotating said drum;

web feeding and positioning means spaced from said drum for directing said web tangentially on to the surface of said drum;

means to retain said web on said drum surface after it has been received thereon;

preliminary sealing means comprising means for bringing a heating bar into contact with a portion of said web located over one of said anvils, for moving said heating bar continuously through a path which includes an arc conforming to the contour of the surface of said drum and synchronously with said anvil during rotation of said drum and retained web through a predetermined distance and for removing said heating bar from contact with said web;

means for bringing a welding bar into seam welding and severance contact with the full width of said web and underlying anvil in registration with the location of prior contact with said heating bar and for removing said welding bar from contact with said web after completion of said seam welding and severance;

web pull-back means located adjacent to said web prior to said preliminary sealing means;

actuating means for causing said web pull-back means to engage said web and apply tension thereto sufficient to pull back the web relative to rotation of said welding drum by a predetermined distance in the direction opposite that of rotation of said drum after said web welding bar has been removed from contact with said web; and means for coordinating the rotation of said drum and the movements of said heating bar, said welding bar and said web pull-back means in mutually timed relationship.

25. Apparatus in accordance with claim 24 wherein said web pull-back means comprises web loop forming means located upstream of said web positioning means.

26. Apparatus in accordance with claim 24 which also comprises means for removing finished bags from said welding drum.

27. Apparatus in accordance with claim 24 wherein said heating bar is mounted on an endless flexible drive member supported on sprockets and provided with drive means to move said belt continuously in said path which includes said arc conforming to the contour of the surface of said welding drum and spaced therefrom a distance such that said heating bar is brought into contact with said web and underlying anvil at the beginning of said arc and moves in synchronism with said web and anvil thereby maintaining said contact while traversing said arc.

28. Apparatus in accordance with claim 27 wherein said endless belt while traversing said arc is supported on a guide rail mounted on the periphery of said surface of said drum.

29. Apparatus in accordance with claim 24 wherein said welding bar is one of a plurality of such bars supported on a hollow cylindrical frame aligned with its axis parallel to that of said welding drum at a location spaced about the latter in the rotation direction away from said preliminary sealing means, said welding bars extending parallel to said axis of said frame, said frame being provided with means for rotating the same in mutually timed relationship with rotation of said welding drum so as to bring each of said welding bars in turn into seam welding and severance contact with and across the whole width of said web and an underlying anvil after withdrawal therefrom of said heating bar of said preliminary sealing means.

30. Apparatus in accordance with claim 29 wherein there are two welding bars in substantially diametrically opposite locations on said frame and four anvils substantially equally spaced apart on the periphery of said welding drum, said welding bars and anvils being so arranged that, as each anvil reaches the location at which the surfaces of the said drum and said frame are closest, said anvil is in registration with a welding bar.

31. Apparatus in accordance with claim 25 wherein said web loop forming means comprises a first set of spaced parallel loop formed rolls disposed in fixed position on one side of said web prior to said web positioning means and a second set of spaced parallel loop former rolls shiftable reciprocatingly in parallel disposition to said fixed loop former rolls and engageable with the other side of the web to form web tensioning loops.

32. Apparatus in accordance with claim 31 wherein the reciprocating movement of said second set of loop former rolls is effected by cam means the operation of which is coordinated with rotation of said welding drum.

33. Apparatus in accordance with claim 32 wherein the distance through which said second set of loop former rolls is movable and the number of former rolls in each of the first and second sets thereof is adjusted so that the tension exerted on the web when said web loop forming means is actuated is such that the web is pulled back relative to rotation of said drum a distance substantially equal to the difference between the distance between neighboring anvils on said welding drum and the width of the bag to be formed.

34. A method for production of bags from thermoplastic film in the form of a continuous longitudinally advanced web having at least two layers with the film layers continuously joined along one longitudinal edge of the web wherein said web has a cross-section such that the thickness at least in one portion of the web is greater than the thickness of another portion of said web, from the leading end of which web bags are successively made by transverse seam welding and severance carried out at substantially equally spaced locations on the web, the steps comprising:

feeding said web tangentially onto the outer surface of a continuously rotating welding drum provided with a plurality of welding anvils extending parallel to the rotational axis of said drum and spaced equally about its circumference;

effecting a preliminary seal during a predetermined length of travel of said web on said drum along one portion of a path transverse to the direction of travel of the web, wherein said one portion has a cross-section greater in the thickness than another portion of said cross-section of the web; and thereafter simultaneously welding and severing said web along the whole of said transverse path inclusive of said preliminary seal.

35. A method in accordance with claim 34 wherein said one portion of said web having a greater thickness has a greater number of film layers than said other portion of said web.

36. Apparatus for fabrication of bags by transverse seam welding and severance from the leading edge of a longitudinally advanced web having at least two layers of thermoplastic film and having the film layers continuously joined along one longitudinal edge of the web wherein said web has a cross-section such that the number of film layers in one portion is greater than in thickness of the remainder of said cross-section, said apparatus comprising:

a frame and a welding drum mounted therein;

said drum having a plurality of elongated welding anvil elements extending parallel to the axis of rotation of said drum and spaced substantially equally about its circumference thereof each anvil element being resiliently mounted in said drum and movable radially toward and away from said drum axis and biased outwardly to a normal position slightly above the drum surface;

means for continuously rotating said drum;

web feeding and positioning means spaced from said drum for directing said web tangentially onto the surface of said drum;

means to retain said web on said drum surface after it has been received thereon;

preliminary sealing means comprising means for bringing a heating bar into contact with a portion of said web, for moving said heating bar synchronously with said anvil during rotation of said drum and retained web through a predetermined distance and for removing said heating bar from contact with said web, wherein said heating bar is mounted on an endless flexible drive member supported on sprockets and provided with drive means to move said belt continuously in a path which includes an arc conforming to the contour of the surface of said welding drum and spaced therefrom a distance such that the heating bar is brought into contact with said web and underlying anvil at the beginning of said arc and moves in synchronism with said web and anvil thereby maintaining said contact while transversing said arc;

means for bringing a welding bar into seam welding and severance contact with the full width of said web and underlying anvil in registration with the location of prior contact with said heating bar and for removing said welding bar from contact with said web after completion of said seam welding and severance;

web pull-back means located adjacent to said web prior to said preliminary sealing means;

actuating means for causing said web pull-back means to engage said web and apply tension thereto sufficient to pull back the web relative to rotation of said welding drum by a predetermined distance in the direction opposite that of rotation of said drum after said welding bar has been removed from contact with said web; and means for coordinating the rotation of said drum and the movements of said heating bar, said welding bar and said web pull-back means in mutually timed relationship.

37. Apparatus in accordance with claim 36 wherein said endless belt while traversing said arc is supported on a guide rail mounted on the periphery of said surface of said drum.

* * * * *